April 28, 1970  R. D. SIMS  3,508,502
RAILROAD CAR AND LADING TIE DOWN MEANS THEREFOR
Filed Dec. 15, 1967  2 Sheets-Sheet 1

Inventor:
Roger D. Sims
By Richard J. Myers
Atty.

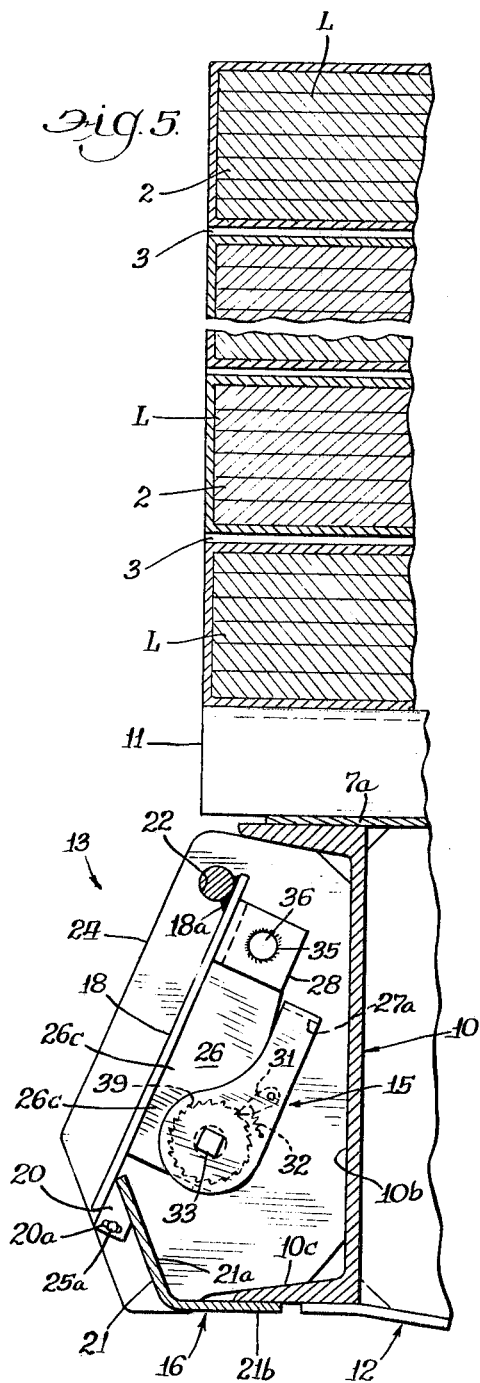
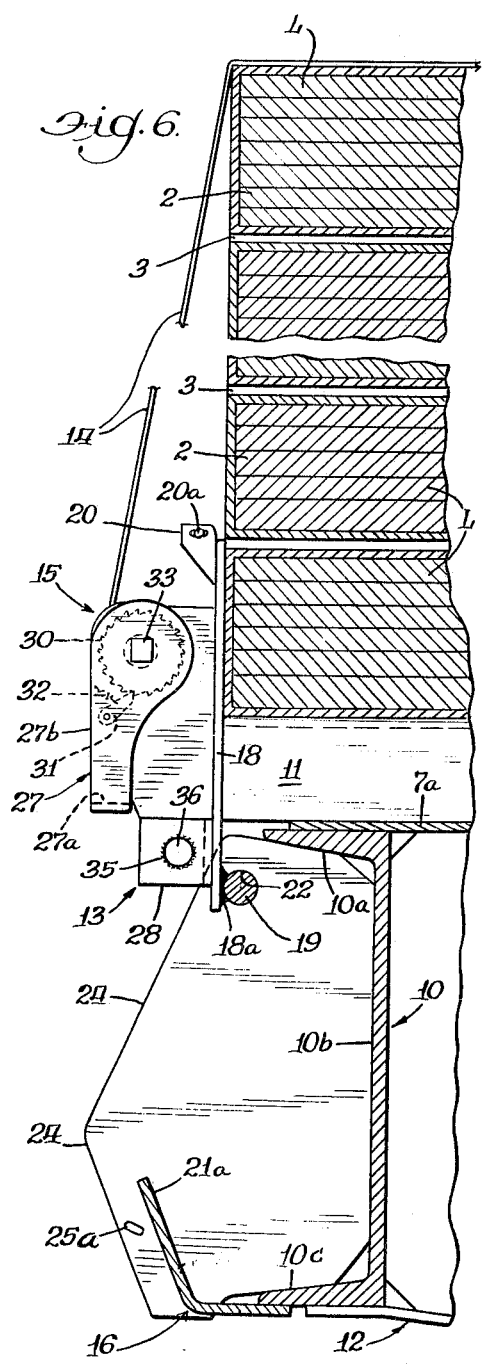

United States Patent Office 3,508,502
Patented Apr. 28, 1970

3,508,502
RAILROAD CAR AND LADING TIE DOWN
MEANS THEREFOR
Roger D. Sims, Highland, Ind., assignor to Pullman
Incorporated, Chicago, Ill., a corporation of Delaware
Filed Dec. 15, 1967, Ser. No. 690,871
Int. Cl. B61d 45/00; B60p 7/08
U.S. Cl. 105—369          7 Claims

ABSTRACT OF THE DISCLOSURE

A flat deck railroad car for carrying lumber or the like and being provided with lumber tie-down means in the form of pivotally mounted ratchet and pawl operated lading strap take-up means carrying strap for tying the lading to the flat deck, the pivotal take-up structure comprising a cover for the lading strap storage and closure wherein the take-up mechanism is mounted on the inside of the cover so as to be out of the way and the cover is closed against the strap receiving trough which may be locked or sealed, there being a plurality of such lading strap take-up devices and straps storage and closure means spaced longitudinally along each side of the flat deck car and each such device being coupled one on the other side to provide for a series of longitudinally spaced tie-down strap arrangements for securing the packaged lumber to the car and wherein there may be further provided the additional lading strap anchor attachments mounted on the covers of the enclosure to provide for tying of additional straps about the lumber.

BACKGROUND OF THE INVENTION

(1) Field of invention

The field of art to which this invention pertains is the field of tie-down structure and in particular relates to the railroad industry wherein lading is transported by flat deck railroad cars or the like and wherein suitable tie-down structure is provided for securing the lading such as packaged lumber or the like to the deck of the railroad car.

(2) Description of the prior art

It has been heretofore known to provide lading carrying flat deck railroad cars with tie-down structure for securing the lading to the car. However, it is a problem to find a compact storage area for the lading tie-down means when it is not being used and it is this area the invention is directed and wherein the invention solves such related problems.

SUMMARY

The invention herein disclosed has for its objective, purpose and advantage the use of a novel lading tie-down structure on a railroad car such as a flat deck car which carries packaged lumber or the like and wherein the tie-down device in one position insures proper and secured binding of the lading to the flat deck and wherein in another position the tie-down means is carefully and protectively stored away where it will not interfere with other operations of the car when its use is not required. The invention provides that the lading strap is carried by a take-up mechanism which is pivotally moved between stored positions within a storage compartment to an out of storage position permitting unraveling of the lading strap for tight securement of the strap about the lading for tying same to the flat deck. The take-up device is mounted on the inside of the pivotal cover of the lading strap storage compartment mounted on the side sill of the car opposite to a similarly mounted lading take-up device and storage compartment on the other side of the car to cooperate with coupling of their respective strap end portions atop the lading for tying same snugly to the flat deck of the car. Further lading tie-down means in the form of wire strap or the like may be tied to anchor means on the inside of each of a pair of laterally opposed covers on opposite sides of the car and about the lading. These and other objectives, advantages and purposes of the invention will become apparent from reference to the following description and attached drawings and appended claims.

BRIEF DESCRIPTION OF THE DRAWINGS

FIG. 5 is a partial cross-sectional view showing the lading strap take-up device and storage trough wherein the take-up device is in the out of use position; and FIG. 6 is a view similar to FIG. 5 but showing the take-up device in the lading securing position with the lading strap disposed about the lading.

DESCRIPTION OF THE PREFERRED EMBODIMENT

Figure 1:
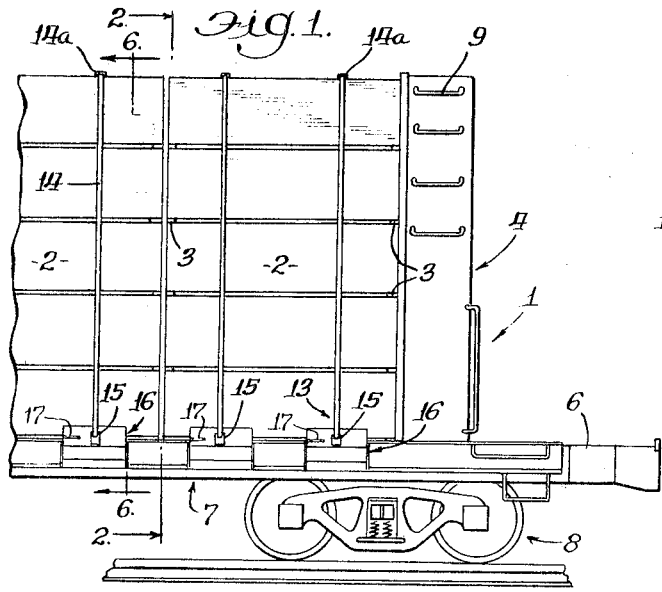
FIG. 1 is a partial view of a railroad flat car carrying packaged lumber and illustrating the novel tie-down arrangement of my invention.
Figure 2:
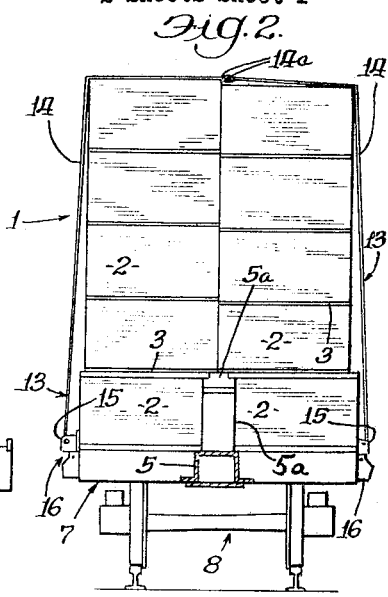
FIG. 2 is a sectional view taken along line 2—2 of FIG. 1.
Figure 3:
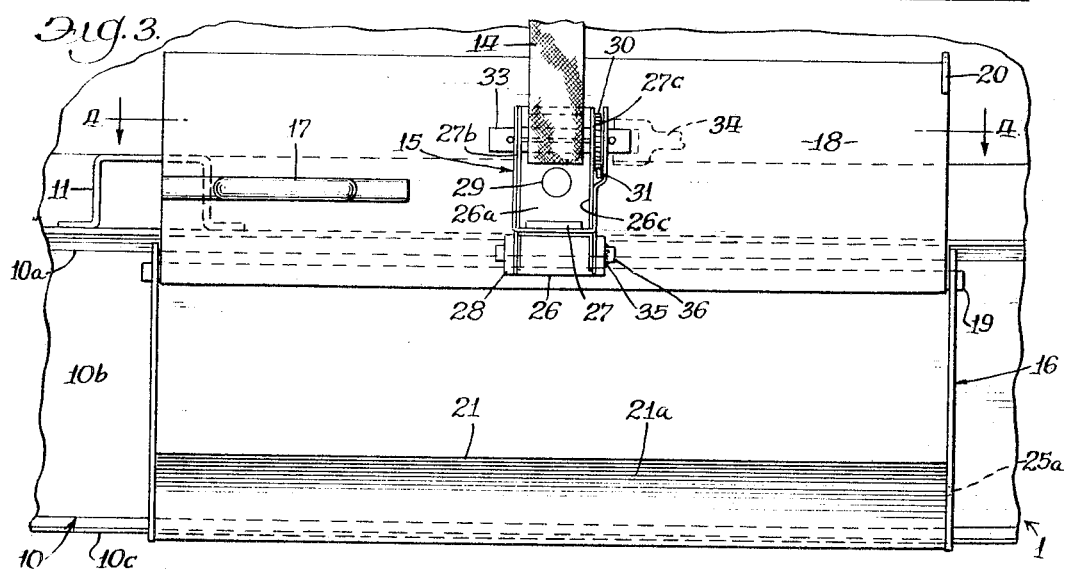
FIG. 3 is an enlarged partial view of the novel tie-down structure as shown in FIG. 1.
Figure 4:
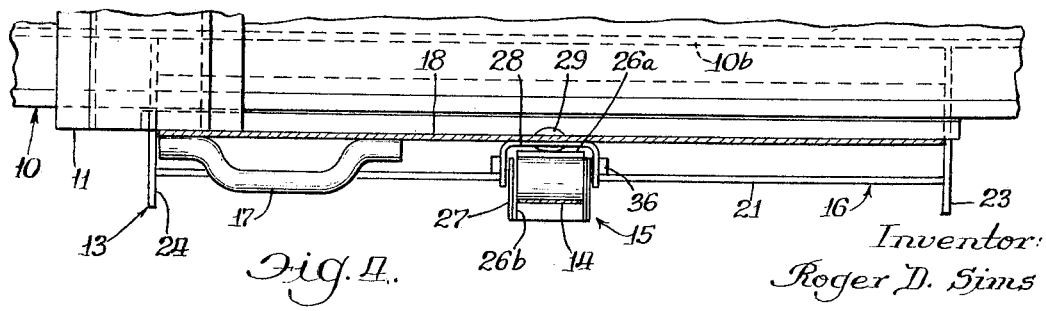
FIG. 4 is a partial sectional view taken along line 4—4 of FIG. 3.

With reference now to the drawings, FIGS. 1 through 6 there is shown a railroad flat deck car 1 carrying packaged lumber 2 on pallets 3 between the end bulkhead 4, 4. The railroad car 1 is provided with the usual fixed center sill 5 and the sliding sill 6 of the cushion underframe type. The underframe 7 of the car 1 is supported on trucks 8 and carries the deck 7a. A raised beam or strong back structure 5a may be provided on the center sill 5 for strengthening of the car. Conventional handholds 9 are provided. The underframe 7 further comprises side sills 10, 10 each having flanges 10a and 10c connected by the web 10b as best shown in FIGS. 5 and 6. The deck structure is provided with the usual hat sections 11 as best seen in FIGS. 3 and 4. The cross member structure 12 of the underframe 7 is shown as for instance in FIGS. 5 and 6.

The car is provided with novel tie-down means 13 which include the lading strap 14 going about the lumber, the ratchet and pawl lading strap take-up device 15 and the strap and take-up device storage trough 16. There is also provided lading strap anchors 17 on the inside of the trough lid or cover 18 of each of the troughs 16. As seen in FIG. 2 there is provided on each lateral side of the car the tie-down means 13 which also extends on each side longitudinally along the car as seen in FIG. 1. Each lateral pair of tie-down means 13, 13 that lies in the same transverse plane cooperate with one another and are provided at their inner ends with couple means 14a (see FIG. 2) for tying each of the lading straps 14, 14 together atop the stacked lumber as seen in FIG. 2. These pair of straps 14, 14 extend longitudinally of the car as seen in FIG. 1. The trough lid or cover 18 has welded to it as by welds 18a (see FIGS. 5 and 6) the pivot shaft 19 which extends longitudinally of the car into the trough end walls or plates 23 and 24 of each of the troughs 16 through the trough end plate bores 22, 22. The trough 16 is further defined by the trough bottom plate 21 which as viewed in FIG. 5 or 6 is L-shaped having upright portion 21a which is sloping slightly outwardly away from the vertical and horizontal portion 21b which is attached to the flange 10c of the side sill 10 wherein the end plates 23 and 24 are also attached to the side sill 10. Each lid or cover plate 18 carries at its outer inner facing end portion, as seen in FIG. 5, a seal locking plate 20 having a hole 20a for complemental alignment with locking hole on the end plate 23, as seen in FIG. 3 for instance, to permit a seal wire 25a to pass through the holes 20a and 25a for locking the cover plate 18 to the trough bottom plate 21, as shown in FIG. 5.

The strap or belt take-up device or means 15 comprises a U-shaped housing having sides 26b and 26c connected by plate portion 26a which is held by rivet 29 to the cover plate 18 (see FIGS. 3 and 4). A handle 27 is pivotally carried on a spindle or windup shaft 33, the handle having an end cross plate 27a engageable with the sides 26b and 26c and held thereagainst by friction as shown in FIG. 5 which may be released as shown in FIG. 6. A channel or U-shaped member 28 is attached to lid 18 and the inner end of the U-shaped housing 26 by the shaft 36 which extends through both the housing 26 and the member 28 and is welded by weld 35 to the member 28. The handle 27 comprises arms 27a, 27b and 27c and carries the pivotal pawl 31 which is provided with a pawl spring 32 for causing engagement of the pawl with the ratchet 30 fixedly mounted on the shaft 33 such as when the handle is moved away from the housing unit 26 the pawl is removed from the ratchet to permit rotation of the spindle 33 in a clockwise direction seen in FIG. 6 to allow the lading strap to be placed up and about the lading and permit coupling with the corresponding lading strap on the opposite side of the car. The shaft may be cranked by a cranking tool 34 (see in dotted line in FIG. 3) that is the windup shaft for tightening down of the strap about the lading.

It is thusly seen that the webbing or strap may be wound about the take-up device and stored within the trough 16 with the lid 18 covering the trough bottom plate 21 to make a completely enclosed trough 16 for enclosing the takeup device 15 and its lading strap 14 as shown in FIG. 5. When the seal wire 25a is broken the lid 18 may be pivoted in the upward direction about pivot shaft 19 to permit exposure of the lading strap 14 whereby the handle 27 may release the ratchet 30 by disengagement of the pawl 31 therefrom to allow the lading strap 14 to be extended up and around the lading to couple with a corresponding lading strap from a corresponding take-up mechanism 15 on the other side of the car as shown in FIG. 6. Thus what is provided is a novel trough and pickup device for permitting lading strap to be passed about the lading and yet to permit easy storage of the strap within a design trough mounted on the side sill of the car.

The foregoing description and drawings are given merely to explain and illustrate the invention, and the invention is not to be limited thereto, except insofar as the appended claims are so limited, since those skilled in the art who have the disclosure before them will be able to make modifications and variations therein without departing from the scope of the invention.

What is claimed is:

1. A flat deck railroad car for supporting lading thereon comprising a lading support deck, longitudinally extending spaced apart side sill structures flanking said deck, lading tie-down means mounted on one of the side sills and comprising lading tie-down storage means and lading tie-down take-up means adapted to carry lading strap, said storage means comprising a trough means mounted on said side sill; said trough means having end wall means and a cover to define a closure for said trough means, pivot means pivotally mounted on the end wall means and dependingly carrying the cover whereby the cover may be swung by the pivot means from a closed trough down position below the pivot means for covering the trough to an open trough elevated position above the pivot means, said cover in the closed position having an inside wall and said take-up device being mounted on the inside wall and being enclosed within the trough means in the closed trough position and being exposed outside the trough in the open trough position, and said take-up means having means for winding and unwinding the lading strap thereabout and for coupling of the lading strap with the opposite side of the railroad car in the trough open position.

2. The invention according to claim 1, and said cover being provided with a cover lock structure and said trough means having said end wall means carrying a lock structure, each of said lock structures having an aperture and seal means being enterable through each of said apertures when the cover is in the closed position.

3. The invention according to claim 1, and said take-up means having ratchet and pawl biased in said ratchet to permit unraveling of the strap when the pawl is disengaged but permitting tightening of the strap about the lading when the pawl is engaged with the ratchet.

4. The invention according to claim 1, and said end walls means having a pair of end walls and said trough means having a bottom wall to define with the cover the closure in the closed position of the cover.

5. The invention according to claim 1, and a second lading storage and a second lading tie-down take-up means mounted on the other side sill opposite the first lading storage means and first lading tie-down take-up means for cooperative coupling therewith by way of lading strap.

6. The invention according to claim 1, and a pair of tie-down anchor means each mounted on opposite sides of the car on a side sill and opposite the other anchor means.

7. The invention according to claim 1, and lading strap anchor means being provided on the inside wall of the cover for tying strap over lading on the car.

References Cited

UNITED STATES PATENTS

| | | | |
|---|---|---|---|
| 1,102,773 | 7/1914 | Martin | 105—369 |
| 2,159,479 | 5/1939 | Goodwin et al. | 105—368 |
| 2,738,204 | 3/1956 | Ibey | 105—369 |
| 3,312,182 | 4/1967 | Broling | 105—369 |
| 3,354,838 | 11/1967 | Mowatt-Larssen | 105—366 |

DRAYTON E. HOFFMAN, Primary Examiner

U.S. Cl. X.R.

280—179